Jan. 2, 1951   R. M. BOWMAN   2,536,154
PENDULUM SCALE
Filed July 23, 1949
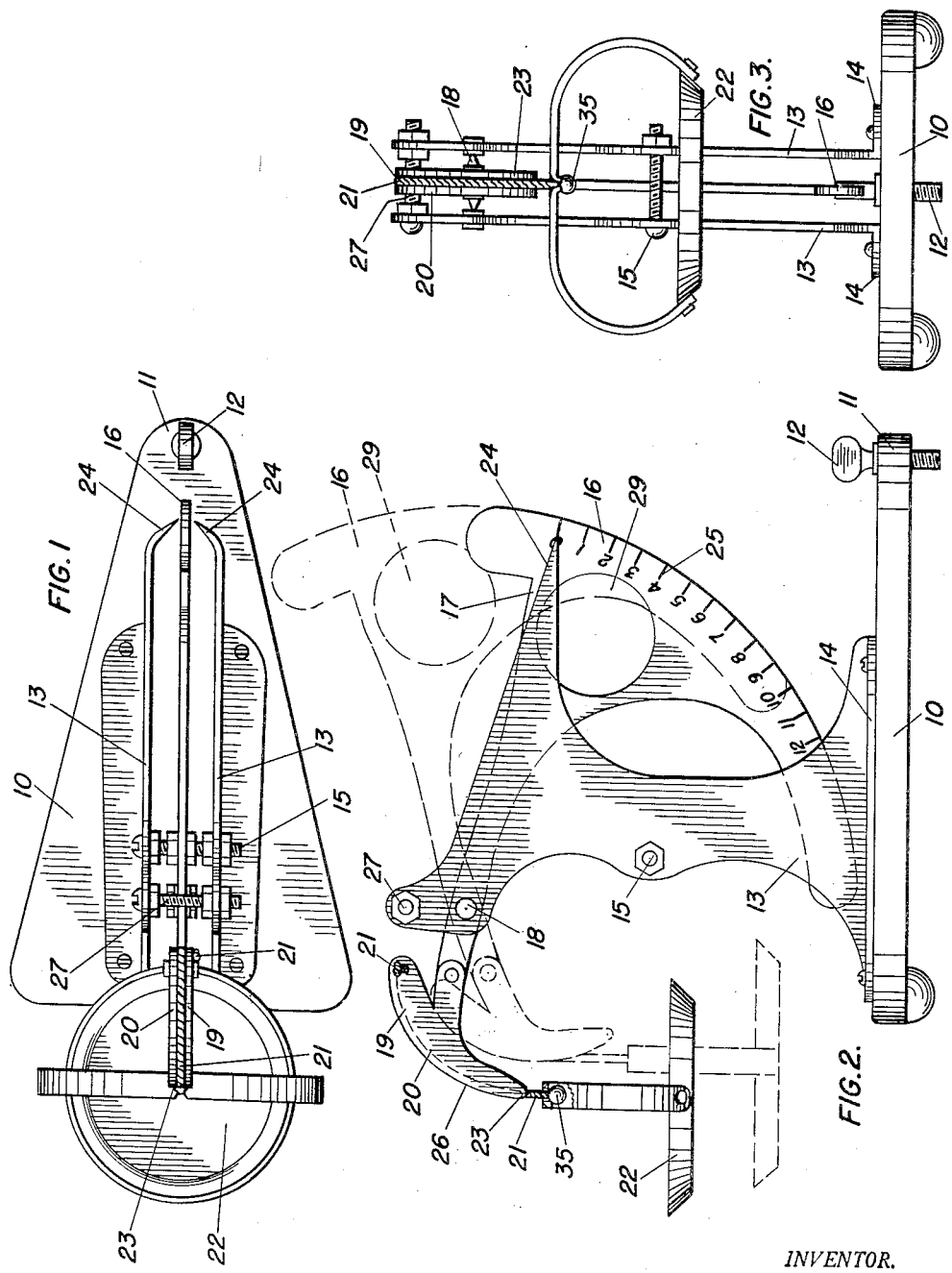
INVENTOR.
REGINALD M. BOWMAN.
BY Howard J. Whelan.
ATTORNEY.

Patented Jan. 2, 1951

2,536,154

UNITED STATES PATENT OFFICE 2,536,154

PENDULUM SCALE

Reginald M. Bowman, Baltimore, Md.

Application July 23, 1949, Serial No. 106,388

2 Claims. (Cl. 265—62)

This invention relates to scales and more particularly to those for weighing relatively small items, especially those used in postal and prescription practice. Further the scales principally are of a springless nature.

It is an object of this invention to provide a new and improved scale that will avoid one or more of the disadvantages and limitations of the prior art.

Another object of the invention is to provide a new and improved scale that will have a minimum of parts and will compensate for the variation in the position of the weighing elements automatically, as it operates in practical use.

A further object of the invention is to provide a new and improved scale that will have an open construction readily observable without uncovering parts or requiring loosening of bolts to accomplish this.

An additional object of the invention is to provide a new and improved scale for desk use that will be attractive in appearance, adjustable for accuracy, substantial in structure although light, and having a design that is particularly adaptable for manufacturing by stamping processes.

A further object of this invention is to provide a scale having a compensating head that changes the fulcrum distances in relation to the height of the weighing pan to enable the graduations on the scale bar to be evenly spaced.

Other objects will be observed as details of the invention are further illustrated.

In the type of postal and prescription scales commonly utilized, and not having springs included in their operation, the suspension for the weighing pan is directly attached to the moving arm that is of an established and unvarying length. The arm will move and provide a different mechanical moment to compensate for the weight in the pan as it tends to change the axial position of the pan with respect to the scales structure.

Also the indicator used for marking the weighing is more or less in the way of the article being weighed. In this invention the placement of the article to be weighed lowers the pan attached to a cord over a compensating segment that keeps the article in the same axial plane as it lowers or rises. At the same time the scale bar with the indices indicating the weight, is out of the way all the time and in weighing is displaced further out of the way of the article. Further by the proper design of the segment, the markings on the scale bar can be spaced uniformly, and thereby be made more convenient to read.

For a further illustration of a particular form of the invention, reference is made to accompanying drawings. These drawings in conjunction with the following description outline the principles and operation and a preferred form of structure to be used, while the claims emphasize the scope of the invention.

In the drawings:

Fig. 1 is a plan view of a scale embodying this invention;

Fig. 2 is a side elevation of Fig. 1, and

Fig. 3 is an end view of Fig. 2 looking at the pan end.

Similar reference numerals relate to the same parts in all the drawings.

In the particular structure shown in the drawings, a base 10 of triangular form is arranged for placement on a flat surface, like a desk or table top. Its apexed end portion 11 has an adjustable screw 12 in it projecting through to the table surface adapted for levelling the base to suit the requirements of the scales and its accurate reading.

A stand 13, consisting of a pair of symmetrical uprights extends vertically from the upper face of the base. The uprights are flanged at the bottoms 14 to enable the stand to be screwed down to the base and hold it in the position indicated. The uprights are kept separated by a bolt and spacer 15 and held rigidly together thereby. This bolt 15 is located about half way up on the uprights and also serves as a limit to restrict the arcuate travel of a flat circular scale bar 16. This scale bar is connected with an arm 17 journalled on a fulcrum 18 placed within the uprights near their upper ends to keep them separated. The arm 17 is extended beyond the fulcrum 18 into a compensatory segment 20 formed as shown in the drawings. A peripheral groove 19 is provided in this segment for a suspension cord 21 of suitable length having a button 35 at the end thereof to suspend a scales pan 22 directly under the point of contact on nose 23 of the segment. Pointers 24 are preferably formed in the material of the uprights by extending them out in winglike formation from the stand so as to align them with the indices 25 on the scale bar 16 as it travels arcuately during the weighing processes. This places the pointers in a convenient position to be read, as the indices pass beyond them. The indices are spaced uniformly and are preferably troy, avoirdupois on one face of the scale bar 16 and metric on the other. As there are two pointers, readings can be made accurately and conveniently from either side of the scales. The segment 20 has its peripheral surface curved arcuately on a cam-like contour 26 and compensated to equalize the pan 22 to the various positions of the scale bar 16 as it is moved by the weights in the pan in its arcuate travel. The contour may be roughly calculated primarily and then empirically adjusted to make it accurate, emphasis being made in the paying-out of the markings and indices on the scale part to keep them uniformly spaced. After the first master scale is accurately designed and tested, its dimensions can be used for those made up for production purposes using the original sample as a guide. The cross bar 27 between the uprights at its uppermost end portion serves as a spacer and limit stop to control the travel of the arm 17 in addition to that used at 15. The form of the pan and its supporting frame can be of any suitable type to suit the materials to be weighed in it but for general purposes the hook-like form shown is preferred. The position of the scale bar with respect to the pointers 24 is adjusted with the scale pan 22 in place. The use of the flexible cord 21 facilitates the movement and action of the segment 20, and the scale pan. It can be noted that the pan in lowering gets closer to the pivotal vertical axis and thereby makes the action of the scales more stable. The adjustment of the base by the screw 12 facilitates the levelling of the scales and promotes accuracy. The use of plural uprights makes it more rugged while not increasing the weight materially while the cross bars 15 and 27 serve not only as braces but as limit stops. The segment 20 automatically compensates for the weight and movements of the scale bar 16 and allows the indices to be uniformly spaced, which is a very desirable feature. The opening 29 in the arm 17, lightens it and also provides for handling the scale bar when it is desirable to hold it for any reason. Since there are no springs to use in the device, its relative accuracy can be maintained indefinitely. There is only one pair of bearings to provide support for the arm 17, and friction is brought to a minimum through the use of jewel bearings arranged to make the bearing wear for a considerable period without producing appreciable inaccuracies.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. A scale comprising a base, a pair of parallel vertical uprights secured to said base, spacing means between said uprights located substantially midway of the ends thereof, a circular scale bar, a fulcrum for said scale bar located between the uprights near the upper ends thereof, said uprights having corresponding symmetrical integral extensions terminating in points and encompassing both sides of the scale bar, said scale bar also having an integral extension protruding on the opposite side of the fulcrum, a segmental head on said extension, a cord secured to and embracing the segmental head and a weighing pan attached to the free end of said cord.

2. A scale as set forth in claim 1, including an upper stop element for said scale bar located between said uprights and above said fulcrum, said segmental head having a groove on its periphery to guide said cord and the aforesaid spacing means between the uprights acting as a lower stop for said scale bar.

REGINALD M. BOWMAN.

REFERENCES CITED

The following references are of record in the file of this patent:

UNITED STATES PATENTS

| Number | Name | Date |
|---|---|---|
| 221,757 | Weaver | Nov. 18, 1879 |
| 262,966 | Martin | Aug. 22, 1882 |
| 373,568 | Richtmann | Nov. 22, 1887 |